(12) United States Patent
Sitnikov et al.

(10) Patent No.: US 10,934,693 B2
(45) Date of Patent: Mar. 2, 2021

(54) HYDRANT MONITORING SYSTEM

(71) Applicant: Mueller International, LLC, Atlanta, GA (US)

(72) Inventors: Timofey Sitnikov, Harrison, TN (US); Paul S. Gifford, Chattanooga, TN (US); Carlos Stephen Moreno, Chattanooga, TN (US); Daryl Lee Gibson, Cleveland, TN (US)

(73) Assignee: Mueller International, LLC, Atlanta, GA (US)

( * ) Notice: Subject to any disclaimer, the term of this patent is extended or adjusted under 35 U.S.C. 154(b) by 15 days.

(21) Appl. No.: 16/435,357

(22) Filed: Jun. 7, 2019

(65) Prior Publication Data

US 2020/0385962 A1 Dec. 10, 2020

(51) Int. Cl.
 *E03B 9/04* (2006.01)
 *G01L 19/08* (2006.01)
 *G01L 19/00* (2006.01)

(52) U.S. Cl.
 CPC ............ *E03B 9/04* (2013.01); *G01L 19/0007* (2013.01); *G01L 19/086* (2013.01); *Y10T 137/5456* (2015.04)

(58) Field of Classification Search
 CPC ....... E03B 9/04; G01L 19/06; G01L 19/0007; Y10T 137/5456
 See application file for complete search history.

(56) References Cited

U.S. PATENT DOCUMENTS

| 4,793,557 | A | 12/1988 | Marchese et al. |
|---|---|---|---|
| D314,227 | S | 1/1991 | Christ |
| 6,816,072 | B2 | 11/2004 | Zoratti |
| 7,980,317 | B1 | 7/2011 | Preta et al. |
| 8,130,107 | B2 | 3/2012 | Meyer |
| 8,589,092 | B2 | 11/2013 | Plouffe et al. |
| 8,614,745 | B1 | 12/2013 | Wasmeyyah |
| 8,657,021 | B1 | 2/2014 | Preta et al. |
| 8,931,505 | B2 | 1/2015 | Hyland et al. |
| 9,291,520 | B2 | 3/2016 | Fleury, Jr. et al. |
| 9,388,554 | B2 | 7/2016 | Bost |
| 9,458,609 | B2 * | 10/2016 | Fleury, Jr. et al. ....... E03B 9/02 |
| D790,663 | S | 6/2017 | Peterson et al. |
| 9,670,650 | B2 | 6/2017 | Pinney et al. |
| 9,849,322 | B2 | 12/2017 | Hyland et al. |
| 9,861,848 | B2 | 1/2018 | Hyland et al. |
| 9,873,008 | B2 | 1/2018 | Silvers et al. |
| 9,901,765 | B2 | 2/2018 | Silvers et al. |

(Continued)

OTHER PUBLICATIONS

Eramosa Engineering, Inc.; Report on Test of Hydrant Network Solutions Inc., Data Rod Assembly for Dry-Barrel Fire Hydrants, publicly available at least as early as Jun. 12, 2018, 23 pgs.

(Continued)

*Primary Examiner* — Kevin L Lee
(74) *Attorney, Agent, or Firm* — Taylor English Duma LLP

(57) ABSTRACT

A sensing assembly includes a vein, the vein defining a channel providing fluid communication from a lower end of the vein to an upper end of the vein; an electronics assembly connected to an upper end of the vein, the electronics assembly comprising: a sensor in fluid communication with the channel; and at least one battery in electrical communication with the sensor; and an antenna in electrical communication with the sensor.

20 Claims, 14 Drawing Sheets

(56) References Cited

U.S. PATENT DOCUMENTS

| | | | |
|---|---|---|---|
| 10,612,216 | B2 | 4/2020 | Kennedy |
| 2008/0189056 | A1 | 8/2008 | Heidl et al. |
| 2017/0082592 | A1 | 3/2017 | Morrow et al. |
| 2017/0121949 | A1 | 5/2017 | Fleury et al. |
| 2017/0370893 | A1 | 12/2017 | West |
| 2018/0093117 | A1 | 4/2018 | Hyland et al. |
| 2020/0071916 | A1 | 3/2020 | Feyling |
| 2020/0080290 | A1 | 3/2020 | Kennedy |
| 2020/0384296 | A1 | 12/2020 | Sitnikov et al. |
| 2020/0385960 | A1 | 12/2020 | Sitnikov et al. |
| 2020/0385961 | A1 | 12/2020 | Sitnikov et al. |

OTHER PUBLICATIONS

Hydrant Network Solutions Inc.; Article entitled: "Hydrant Data Rod", copyright 2016, 1 pg.

Hydrant Network Solutions Inc.; Brochure for Hydrant Data Rod, publicly available at least as early as Jun. 12, 2018, 6 pgs.

Nighthawk; Info Sheet for Intelligent Hydrant Solutions Remote Pressure and Temperature Monitoring, located <http://nighthawkcontrol.com/upl/downloads/industry-solutions/reference/ihydrant-poster-presentation-wet-dry-barrel-15988aaa.pdf>, accessible at least as early as Apr. 19, 2019, 1 pg.

Terepac; Article entitled: "One Water", located at <https://www.terepac.com/one-water>, available at least as early as Mar. 2019 according to the Wayback Machine, 5 pgs.

Nighthawk; Info Sheet for iHydrant: Remote Hydrant Pressure & Temperature Monitoring, located at <http://nighthawkcontrol.com/upl/downloads/industry-solutions/reference/ihydrant-info-sheet-71fd3465.pdf>, accessible at least as early as Apr. 19, 2019, 1 pg.

Sitnikov, Timofey; Non-Final Office Action for U.S. Appl. No. 16/435,339, filed Jun. 7, 2019, dated Jun. 1, 2020, 12 pgs.

Sitnikov, Timofey; Applicant-Initiated Interview Summary for U.S. Appl. No. 16/434,915, filed Jun. 7, 2019, dated Oct. 19, 2020, 7 pgs.

Sitnikov, Timofey; Applicant-Initiated Interview Summary for U.S. Appl. No. 16/434,915, filed Jun. 7, 2019, dated Nov. 20, 2020, 7 pgs.

Sitnikov, Timofey; Non-Final Office Action for U.S. Appl. No. 16/434,915, filed Jun. 7, 2019, dated Sep. 10, 2020, 22 pgs.

Sitnikov, Timofey; Notice of Allowance for U.S. Appl. No. 16/435,339, filed Jun. 7, 2019, dated Sep. 8, 2020, 5 pgs.

Sitnikov, Timofey; Notice of Allowance for U.S. Appl. No. 16/434,915, filed Jun. 7, 2019, dated Dec. 7, 2020, 7 pgs.

Sitnikov, Timofey; Corrected Notice of Allowance for U.S. Appl. No. 16/435,339, filed Jun. 7, 2019, dated Dec. 16, 2020, 7 pgs.

\* cited by examiner

HYDRANT MONITORING SYSTEM

TECHNICAL FIELD

This disclosure relates to water control products. More specifically, this disclosure relates to smart water control products.

BACKGROUND

In water systems, flow control typically requires knowledge about the system. In particular, in municipal water systems, understanding and maintaining necessary flow for health and safety of the population requires knowledge regarding the flow in the line. To attain the required knowledge about the flow, one solution includes sensing the flow. However, in the field, placing sensors can be difficult, and the sensors can cause weaknesses in water mains. Additionally, miles and miles or wiring would be needed to connect sensors from the field to a main monitoring and control station.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

A fire hydrant can include an upper barrel defining a cavity for fluid flow; a bonnet connected to a top of the upper barrel; a lower barrel assembly connected to a bottom of the upper barrel, the lower barrel assembly comprising a lower barrel defining a cavity in fluid communication with the cavity of the upper barrel, the lower barrel assembly comprising a sensing assembly located within the cavity of the lower barrel, the sensing assembly comprising: a vein, the vein defining a channel providing fluid communication from a lower end of the vein to an upper end of the vein; an electronics assembly connected to an upper end of the vein, the electronics assembly comprising: a sensor in fluid communication with the channel; at least one battery in electrical communication with the sensor; and an antenna in electrical communication with the sensor; and a cover surrounding the electronics assembly, the cover defining a void, wherein at least a portion of the antenna protrudes through the void; a shoe connected to a bottom of the lower barrel assembly, the shoe defining a cavity; a valve assembly located in sealing communication with a lower end of the lower barrel, the valve assembly comprising: a valve plate for sealing the valve proximate a lower end of the lower barrel, the valve plate defining a vein bore; a valve retainer contacting the valve plate and located within the cavity of the shoe, the valve retainer defining a vein bore; and a valve reinforcement contacting the valve plate and located within the cavity of the lower barrel, the valve reinforcement defining a vein bore, wherein the channel of the vein is in fluid communication with the cavity of the shoe through the vein bore of the valve plate, the vein bore of the valve retainer, and the vein bore of the valve reinforcement; and a stem mechanically connected to the valve assembly to allow opening and closing of the sealing communication of the valve assembly with the lower end of the lower barrel.

A sensing assembly can include a vein, the vein defining a channel providing fluid communication from a lower end of the vein to an upper end of the vein; an electronics assembly connected to an upper end of the vein, the electronics assembly comprising: a sensor in fluid communication with the channel; at least one battery in electrical communication with the sensor; and an antenna in electrical communication with the sensor; and a cover surrounding the electronics assembly, the cover defining a void, wherein at least a portion of the antenna protrudes through the void.

A method of forming a sensing assembly can include obtaining a vein, the vein defining a channel providing fluid communication from a lower end of the vein to an upper end of the vein; connecting an electronics assembly connected to an upper end of the vein, wherein the step of connecting an electronics assembly to an upper end of the vein comprises: placing a sensor in fluid communication with the channel; connecting at least one battery in electrical communication with the sensor; and connecting an antenna in electrical communication with the sensor; placing a cover surrounding the electronics assembly, the cover defining a void; and arranging the antenna wherein at least a portion of the antenna protrudes through the void. Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
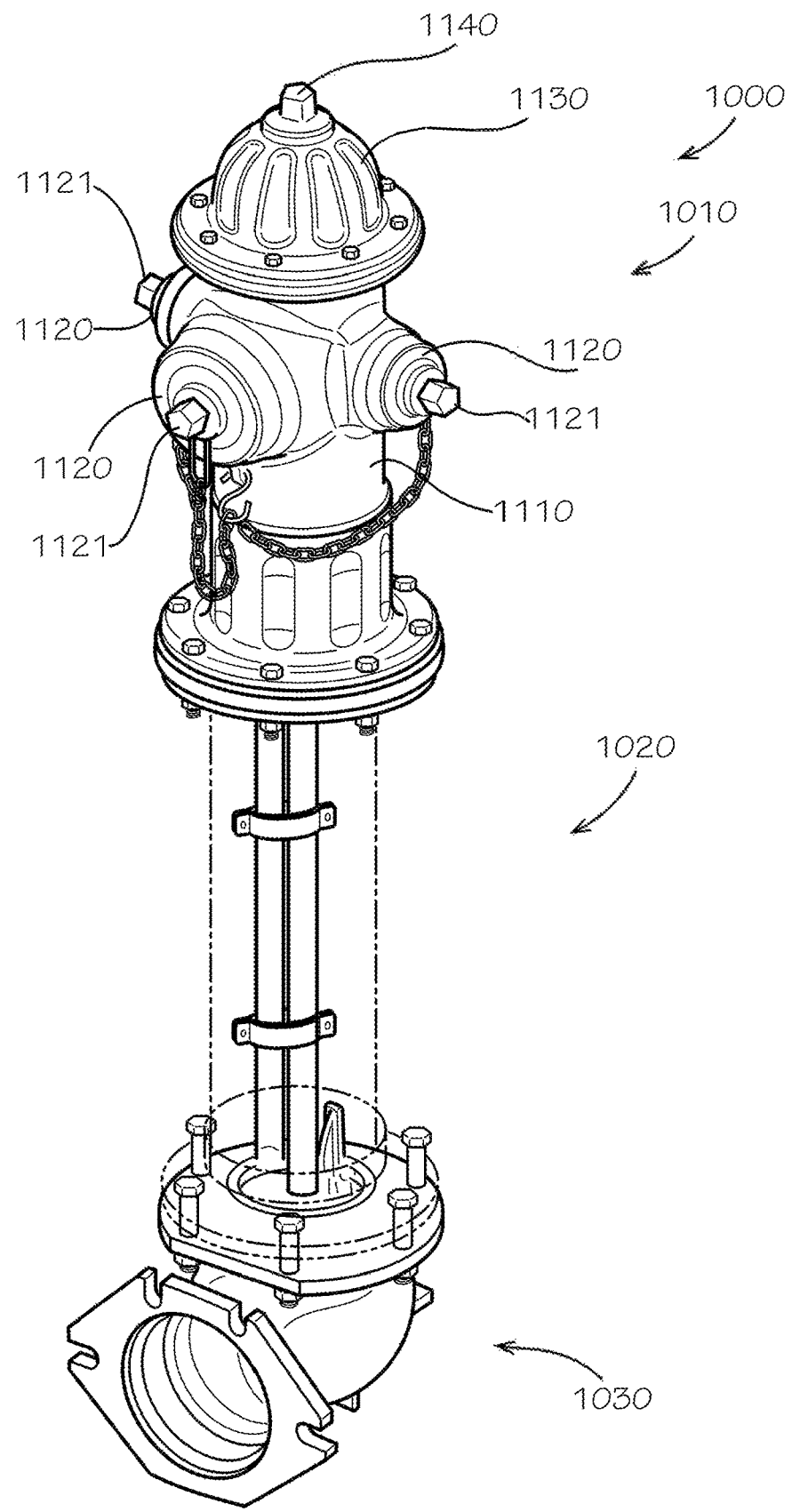
FIG. 1 is a perspective view of a fire hydrant assembly in accord with one aspect of the current disclosure, wherein a portion of the assembly is displayed as transparent.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a fire hydrant and associated methods, systems, devices, and various apparatus. The fire hydrant can comprise a sensing assembly. It would be understood by one of skill in the art that the disclosed fire hydrant is described in but a few exemplary aspects among many. No particular terminology or description should be considered limiting on the disclosure or the scope of any claims issuing therefrom.

One aspect of a fire hydrant 1000 is disclosed and described with reference to FIG. 1. The fire hydrant 1000 can be equipped with apparatus sufficient to sense water flow characteristics. The fire hydrant 1000 can be equipped with apparatus sufficient to communicate from the fire hydrant 1000 to outside nodes of a network. The fire hydrant 1000 can be equipped with apparatus sufficient to communicate from one location within the fire hydrant 1000 to another location within the fire hydrant 1000 for repeating outside the network. In various aspects, the fire hydrant 1000 can communicate sensed data from the water flow. One of skill in the art would understand that the disclosed fire hydrant 1000 provides but a few exemplary aspects that can be implemented in many ways with sufficient knowledge and skill in the art.

The fire hydrant 1000 can comprise an upper barrel assembly 1010, a lower barrel assembly 1020, and a shoe 1030. In various aspects, the fire hydrant 1000 can be arranged such that the upper barrel assembly 1010 can be above ground, the lower barrel assembly 1020 can be at least partially subterranean, and the shoe 1030 can be connected to the municipal water system in the ground.

The upper barrel assembly 1010 can comprise an upper barrel 1110, a plurality of nozzles 1120 adapted for connection of fire hoses or other equipment, nozzle caps 1121 covering the nozzles 1120 and adapted to be removable, and a bonnet 1130 connected or attached to the upper barrel 1110. In the current aspect, the bonnet 1130 can be attached to the upper barrel 1110 by bolts. The upper barrel assembly 1010 can be connected or attached to the lower barrel assembly 1020; in the current aspect, the attachment can be made by bolts. A stem 1210 (seen with reference to FIG. 2) can be located within the fire hydrant 1000 and can connect from the bonnet 1130 to a valve assembly 1220 (seen with reference to FIG. 2) located at the juncture between the shoe 1030 and the lower barrel assembly 1020. The stem can be actuated by an operation nut 1140 at the top of the bonnet 1130.

Figure 2:
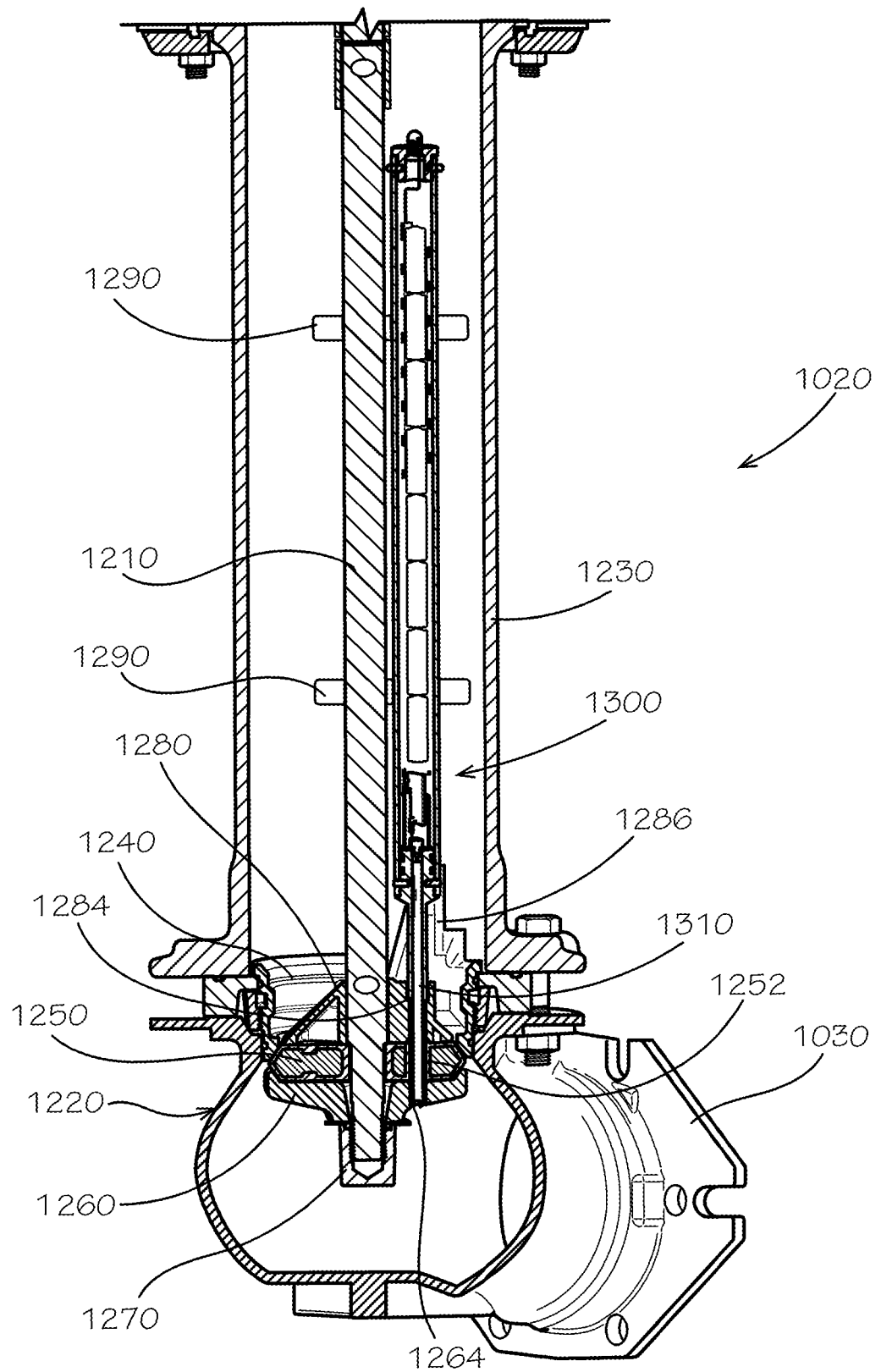
FIG. 2 is a cross-sectional view of the fire hydrant assembly of FIG. 1.

As seen with reference to FIG. 2, the stem 1210 can connect to the valve assembly 1220 for actuation when in use. The lower barrel assembly 1020 can comprise a lower barrel 1230. In most arrangements, the fire hydrant 1000 can be in a state such that no water is located in the upper barrel 1110 or the lower barrel 1230. In use, the valve assembly 1220 can be operated by the operation nut 1140 to open the valve assembly 1220 and to allow the flow of water into the upper barrel 1110 and the lower barrel 1230. As seen with reference to FIG. 2, a valve shoe 1240 can be located to connect the lower barrel 1230 to the shoe 1030.

The valve assembly 1220 can comprise multiple parts. A valve plate 1250 can comprise a rigid or semi-rigid disc or other covering. In various aspects, the valve plate 1250 can be coated in a sealing material such as rubber or elastomer. Location of the valve plate 1250 can provide the water seal that can prevent water from ascending into the lower barrel 1230. The valve assembly 1220 can comprise a valve retainer 1260 located adjacent to the valve plate 1250 that can actuate the valve plate 1250. In various aspects, the valve retainer 1260 can provide the translational force to seal the valve plate 1250 to the valve shoe 1240. A valve nut 1270 can be attached or connected to an end of the stem 1210. The valve nut 1270 can provide a linkage of the stem 1210 to the valve retainer 1260. A valve reinforcement 1280 can be attached to or located proximate to the valve plate 1250.

In various aspects, the fire hydrant 1000 can comprise a sensing assembly 1300. The sensing assembly 1300 can be included to provide water sensing capabilities. In various aspects, the sensing assembly 1300 can comprise communication capabilities. In various aspects, the sensing assembly 1300 can comprise wireless communication capabilities.

Figure 3A:
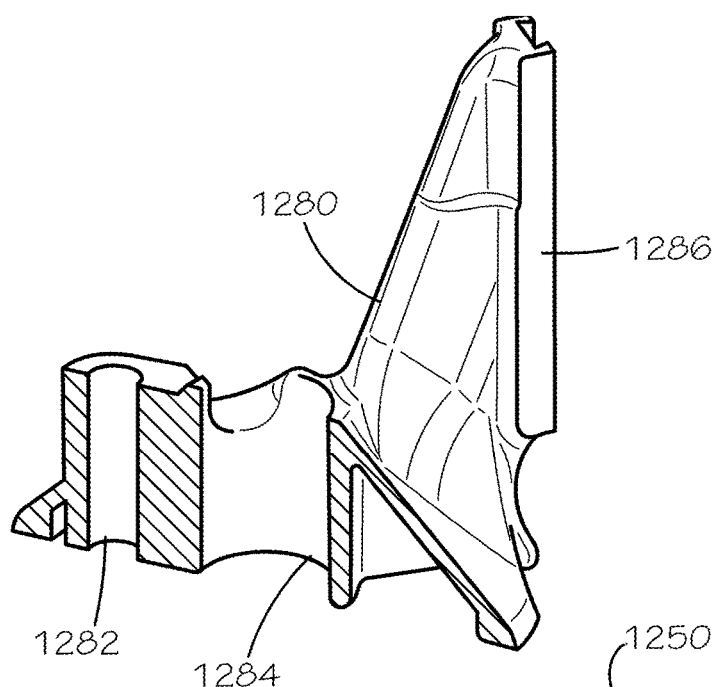
FIG. 3A is a cross-sectional view of a valve reinforcement of the fire hydrant assembly of FIG. 1.
Figure 3B:
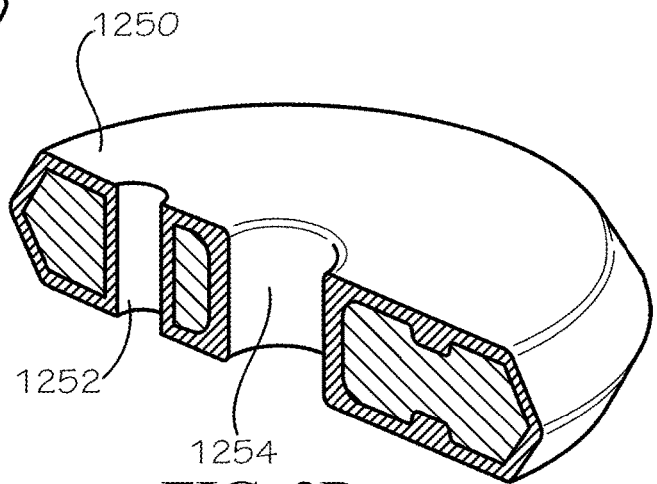
FIG. 3B is a cross-sectional view of a valve plate of the fire hydrant assembly of FIG. 1.
Figure 3C:
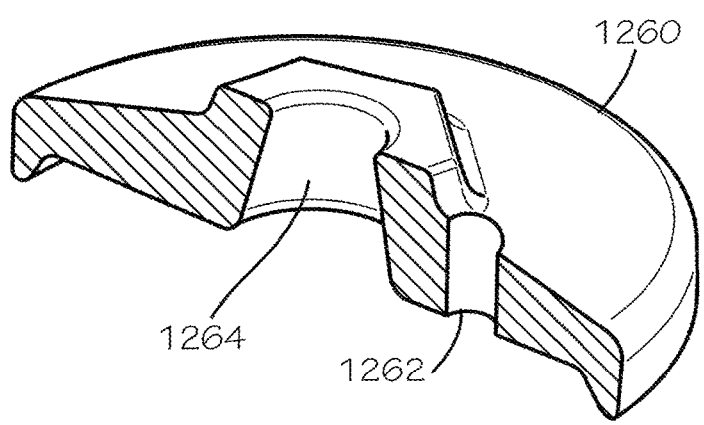
FIG. 3C is a cross-sectional view of a valve retainer of the fire hydrant assembly of FIG. 1.

As see with reference to FIG. 3, each of the valve plate 1250, the valve retainer 1260, and the valve reinforcement 1280 can comprise features to allow the sensing assembly 1300 access to the water supply. Without access, the sensing assembly 1300 could not provide any sensed data. As such, a vein bore 1252 can be defined within the valve plate 1250. A vein bore 1262 can be defined within the valve retainer 1260. A vein bore 1282 can be defined within the valve reinforcement 1280. Also seen, each of the valve plate 1250, valve retainer 1260, and valve reinforcement 1280 can comprise a location for the stem 1210. The valve plate 1250 can define a stem bore 1254. The valve retainer 1260 can define a stem bore 1264. The valve reinforcement 1280 can define a stem bore 1284. The valve reinforcement 1280 can comprise a stanchion 1286.

Figure 4:
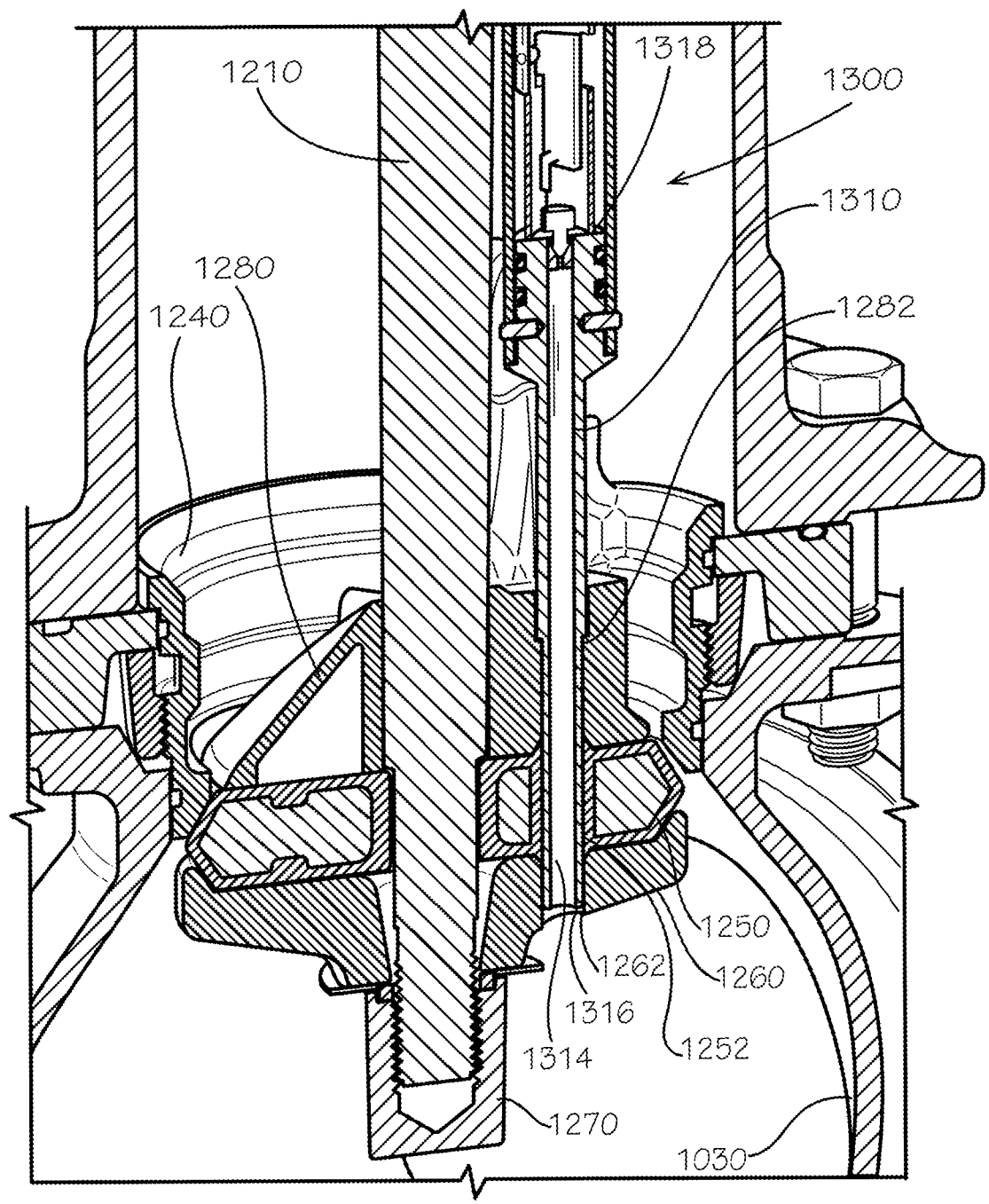
FIG. 4 is a close-up view of the cross-sectional view of the fire hydrant assembly of FIG. 1.

As seen with reference to FIG. 4 and with returning reference to FIG. 2, the sensing assembly 1300 can be connected to the stem 1210 using ring connectors 1290. The ring connectors 1290 can provide a loose connection to the stem 1210 such that the stem is not restricted from rotation when needed to be in use. The sensing assembly 1300 can also be more fixedly connected to the stanchion 1286. Additionally, a vein 1310 of the sensing assembly 1300 can be inserted through the vein bores 1252, 1262, 1282. The vein 1310 can define a channel 1314. The channel 1314 can be defined within the vein 1310 from a bottom end 1316 to a top end 1318 of the vein 1310. The channel 1314 can allow fluid communication from inside the shoe 1030 to sensing apparatus described in more detail below.

Figure 5:
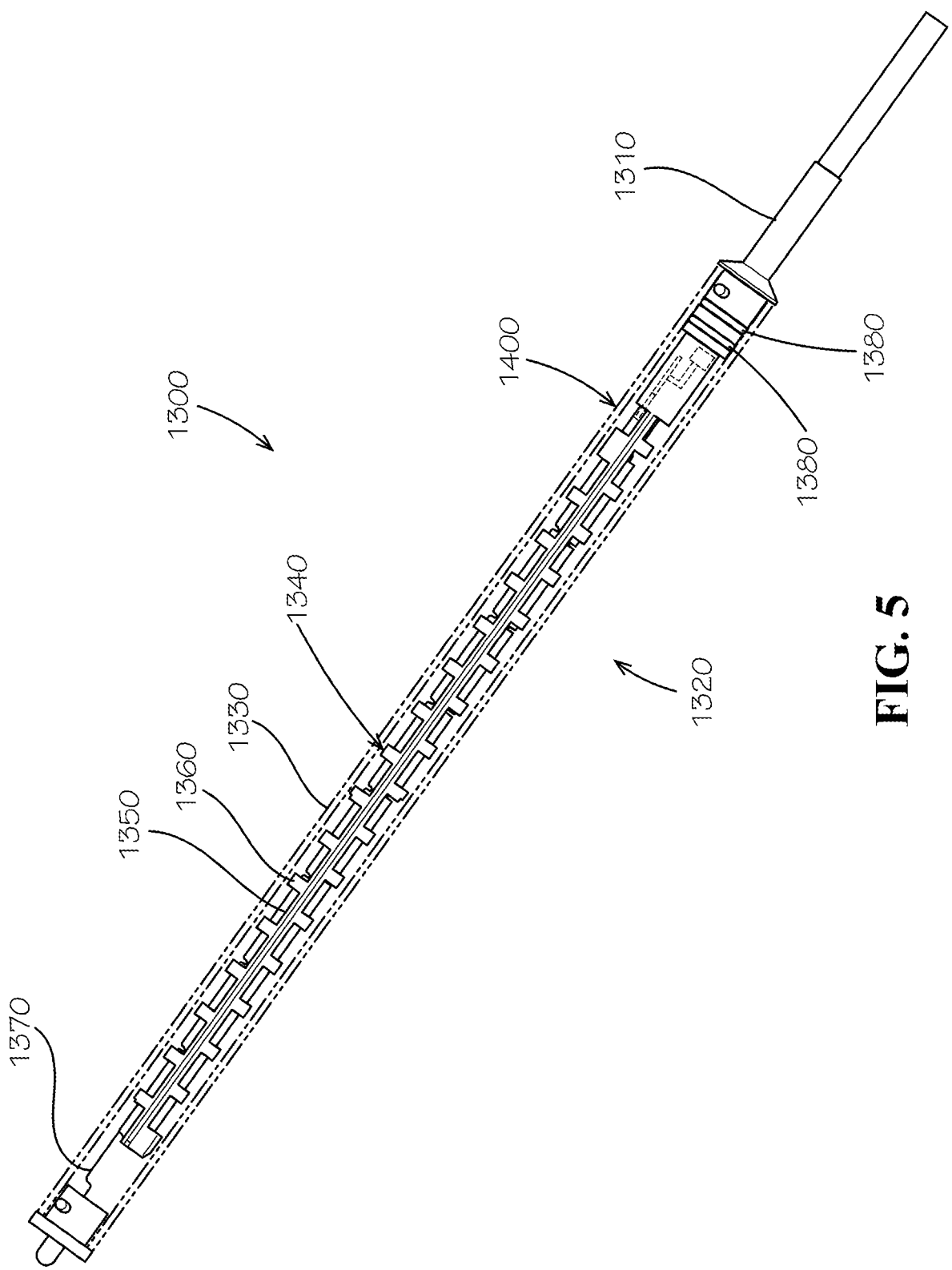
FIG. 5 is a perspective view of a sensing assembly of the fire hydrant assembly FIG. 1, wherein a portion of the assembly is displayed as transparent.

As seen with reference to FIG. 5, the sensing assembly 1300 of the current aspect can comprise the vein 1310. The vein 1310 can be generally cylindrical in the current aspect; in various aspects, the vein 1310 can be conical, frusto-conical, or a variety of shapes as would be desired and understood by one in the art. The vein 1310 can define a lower portion of the sensing assembly 1300. A main body 1320 of the sensing assembly 1300 can be attached or connected to the vein 1310. In various aspects, portions of the main body 1320 can in fluid communication with the vein 1310; in various aspects, portions of the body 1320 can be sealed or otherwise isolated from fluid.

The sensing assembly 1300 can comprise a sheath or cover 1330 covering the main body 1320. In the current view, the cover 1330 is shown as translucent for ease of reference to the parts within. The cover 1330 can contain or cover a battery pack assembly 1340. The battery pack assembly can comprise batteries 1350 and a battery container 1360. The sensing assembly 1300 can comprise an electronics assembly 1400 in electrical communication with the batteries 1350. The sensing assembly 1300 can comprise an antenna 1370 in electrical communication with the batteries 1350. The main body 1320 can comprise a plurality of gaskets 1380 for fluid isolation between the cover 1330 and the vein 1310.

Figure 6:
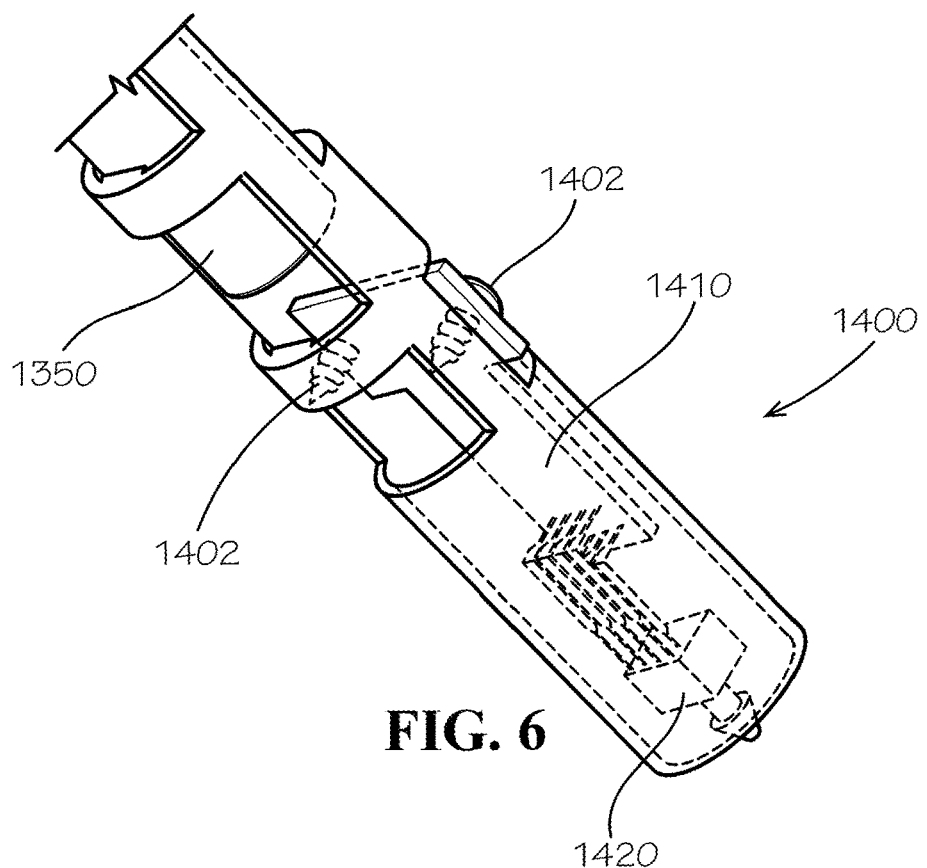
FIG. 6 is a close-up view of a portion of the sensing assembly of FIG. 5.

As seen with reference to FIG. 6, the electronics assembly 1400 can comprise a printed circuit board (PCB) 1410 attached to the main body 1320 by fasteners 1402. In various aspects, the fastener 1402 can be any fastener known in the art, including glue, welding, nails, mechanical locks, and mechanical fasteners, among others. In various aspects, the PCB 1410 can be various arrangements of electronic components. In various aspects, the PCB 1410 can be eliminated by circuitry. The PCB 1410 in the current aspect can be in electrical communication with a sensor 1420. The sensor 1420 can be of a variety of sensors known in the art, including pressure, temperature, salinity, purity, and various other sensing types. The PCB 1410 can also be in electrical communication with the batteries 1350.

Figure 7:
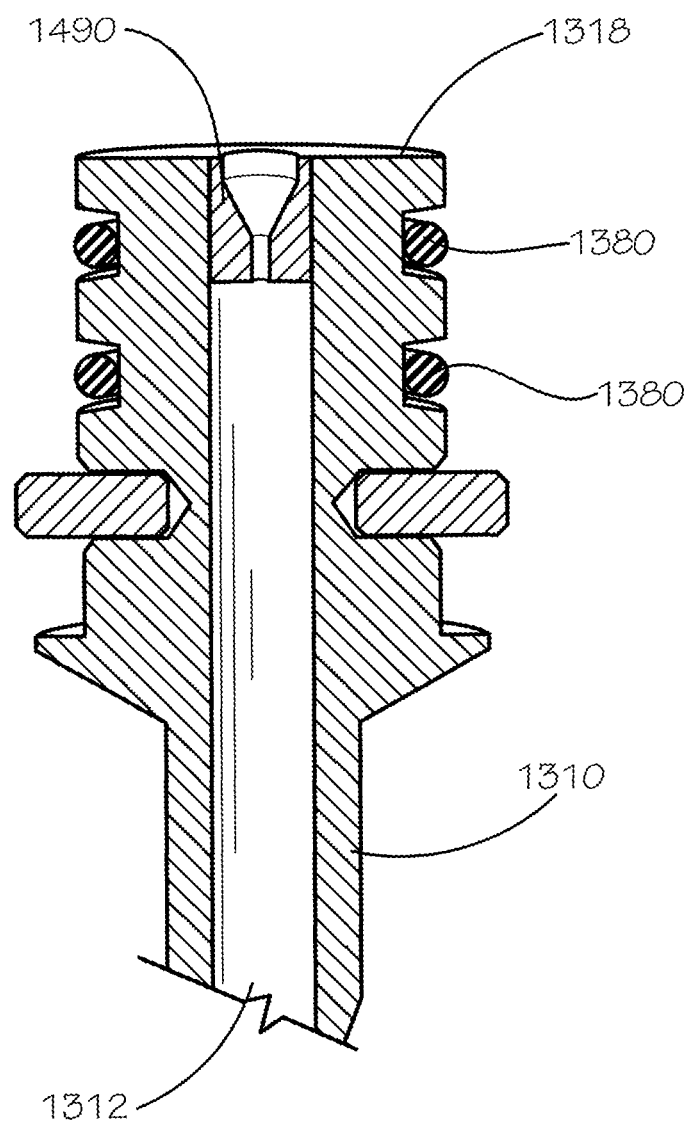
FIG. 7 is a close-up cross-sectional view of a vein of the sensing assembly of FIG. 5.

As seen with reference to FIG. 7, a nozzle 1490 can be defined within or placed within the channel 1314. The nozzle 1490 can provide a location of attachment for the sensor 1420. The nozzle 1490 can be shaped to interact with the sensor 1420 to allow fluid communication of the sensor 1420 with the channel 1312 while maintaining a fluid seal. In various aspects, the nozzle 1490 can be of a variety of materials, including various rubbers, to allow fluid sealing under the high pressures of municipal water systems.

Figure 8:
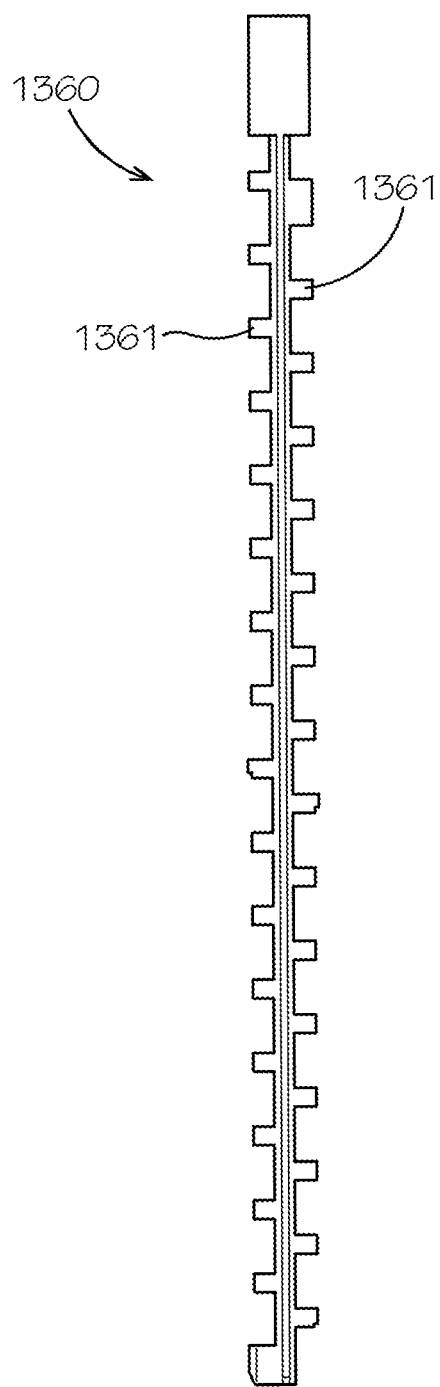
FIG. 8 is a side view of a battery container of the sensing assembly of FIG. 5.
Figure 9:
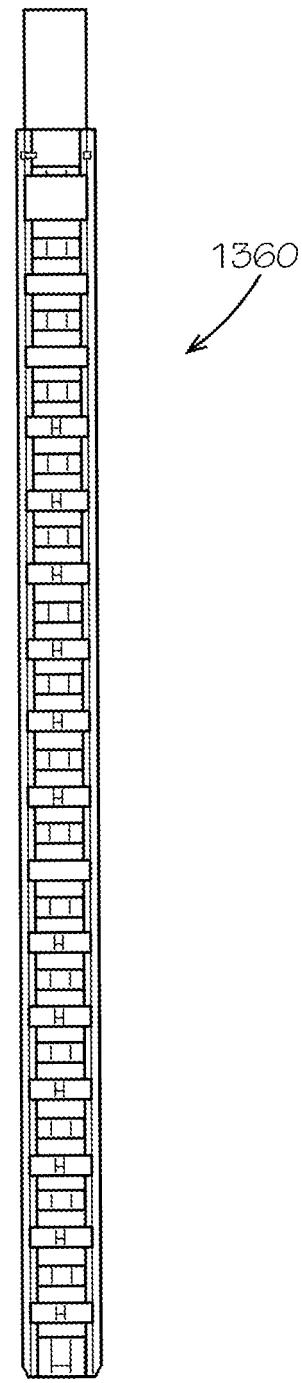
FIG. 9 is an alternate side view of a battery container of the sensing assembly of FIG. 5.

As seen with reference to FIGS. 8-9, the battery container 1360 can be a semi-rigid container to hold batteries 1350 without substantial bulk. The battery container 1360 can be substantially laddered having a plurality of bands 1361 arranged to alternate location on sides of the battery container 1360. As a result, the battery container 1360 can serve as a rigid or semi-rigid container in various aspects for a plurality of batteries 1350. In the current aspect, the battery container 1360 can contain six batteries 1350, although any number of batteries can be present in other aspects. The battery container 1360 can be a part of the sensing assembly 1300.

Figure 10:
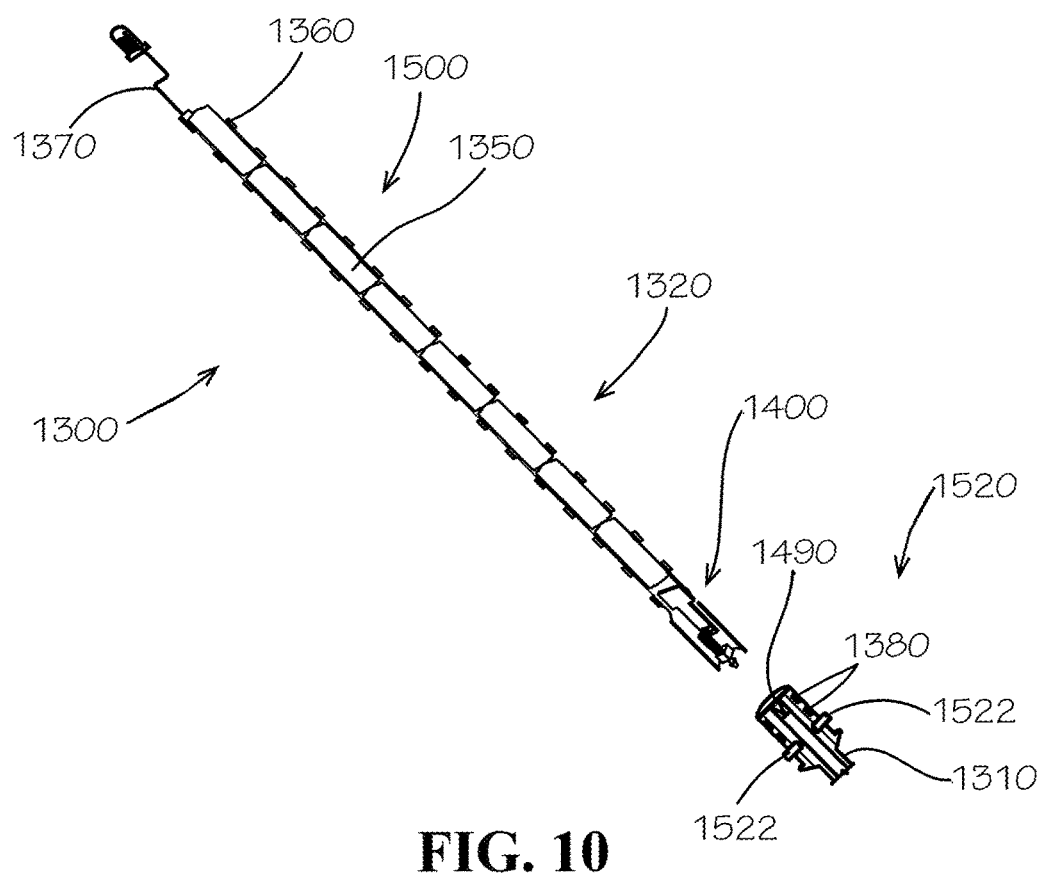
FIG. 10 is a cross-sectional view of the sensing assembly of FIG. 5 wherein a cover is omitted.

As seen with reference to FIG. 10, the sensing assembly 1300 can be arranged in a plurality of subassemblies. An upper subassembly 1500 can comprise the batteries 1350, the battery container 1360, the antenna 1370, and the electronics assembly 1400. Further, the vein 1310 can be arranged separately as a vein subassembly 1520 of the vein 1310, the gaskets 1380, and the nozzle 1490. In various aspects, the vein subassembly 1520 can be substantially one part, such as the vein 1310; in various aspects, the vein subassembly 1520 can be several parts integrated together. As can be seen, the sensing assembly 1300 can be arranged by connecting the upper subassembly 1500 with the vein subassembly 1520 and connecting the cover 1330 (not shown in the current view) over the main body 1320. The cover 1330 can be connected to the main body by rivets 1522.

Figure 11:
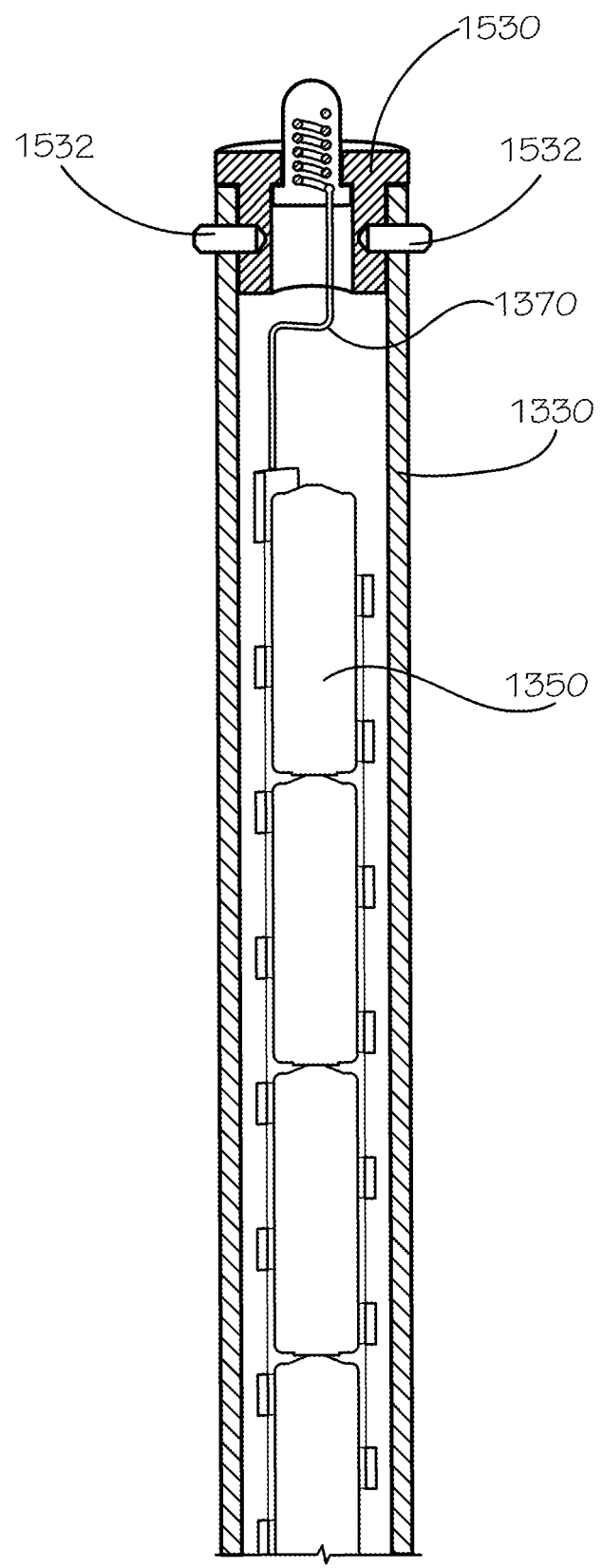
FIG. 11 is a close-up cross-sectional view of the sensing assembly of FIG. 5.

As seen with reference to FIG. 11, a sealing cap 1530 can be arranged to seal the cover 1330 and provide a fluid seal to prevent fluid within the fire hydrant 1000 from coming into contact with any electronics. The sealing cap 1530 can be formed of a fluid sealing material such as rubber or the like. The sealing cap 1530 can define a void to allow portions of the antenna 1370 to protrude through. The antenna 1370 can be allowed to protrude through to allow near-field communication with a repeater elsewhere in the fire hydrant 1000 or in close proximity to the fire hydrant 1000 such that interference is minimized. In one aspect, the antenna 1370 can be in wireless communication with a repeater located within the bonnet 1130. The repeater can then communicate data from the antenna 1370 to a network outside of the fire hydrant 1000. In various aspects, the bonnet 1130 can be formed of a non-ferrous material to prevent communication interference from the bonnet 1130 to the network. The sealing cap 1530 can be attached to the cover 1330 by rivets 1532. In various aspects, the sealing cap 1530 can be attached by various means, including threading, gluing, sealing, or integrated formation with the cover 1330.

Figure 12:
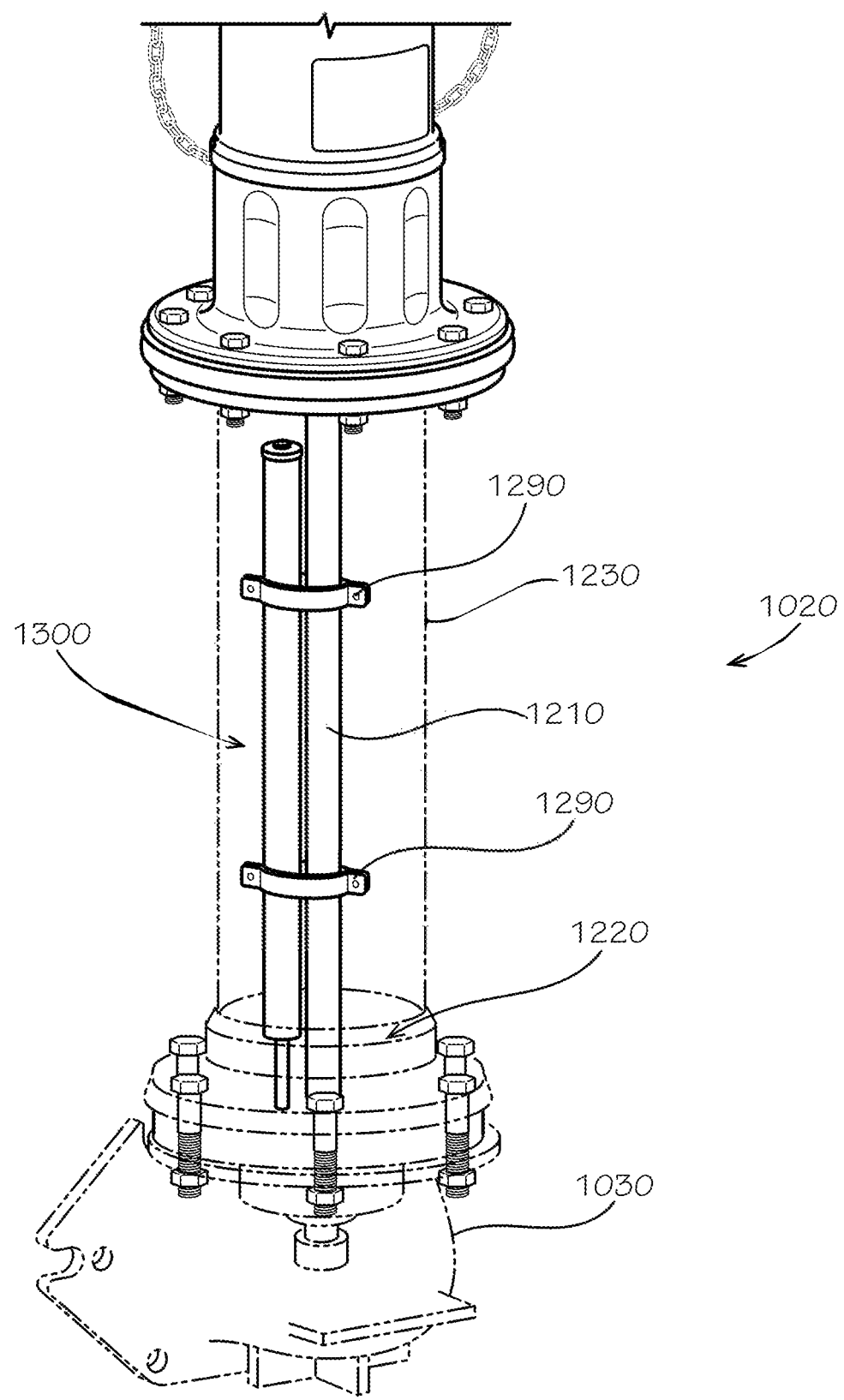
FIG. 12 is a close-up perspective view of the fire hydrant assembly of FIG. 1, wherein a portion of the assembly is displayed as transparent.

As seen with reference to FIG. 12, the sensing assembly 1300 can be loosely attached to the stem 1210 with the ring connectors 1290. The sensing assembly 1300 can be more fixedly connected to the valve assembly 1220 such that the sensing assembly 1300 can move parallel with respect to the stem 1210 if the valve assembly 1220 is ever utilized to allow water from the shoe 1030 into the lower barrel 1230. In such a situation, apparatus utilized to fluid seal any electronics within the sensing assembly 1300 can prevent the sensing assembly 1300 from becoming disabled by fluid conduction and shorting or through corrosion of the batteries 1350.

Figure 13:
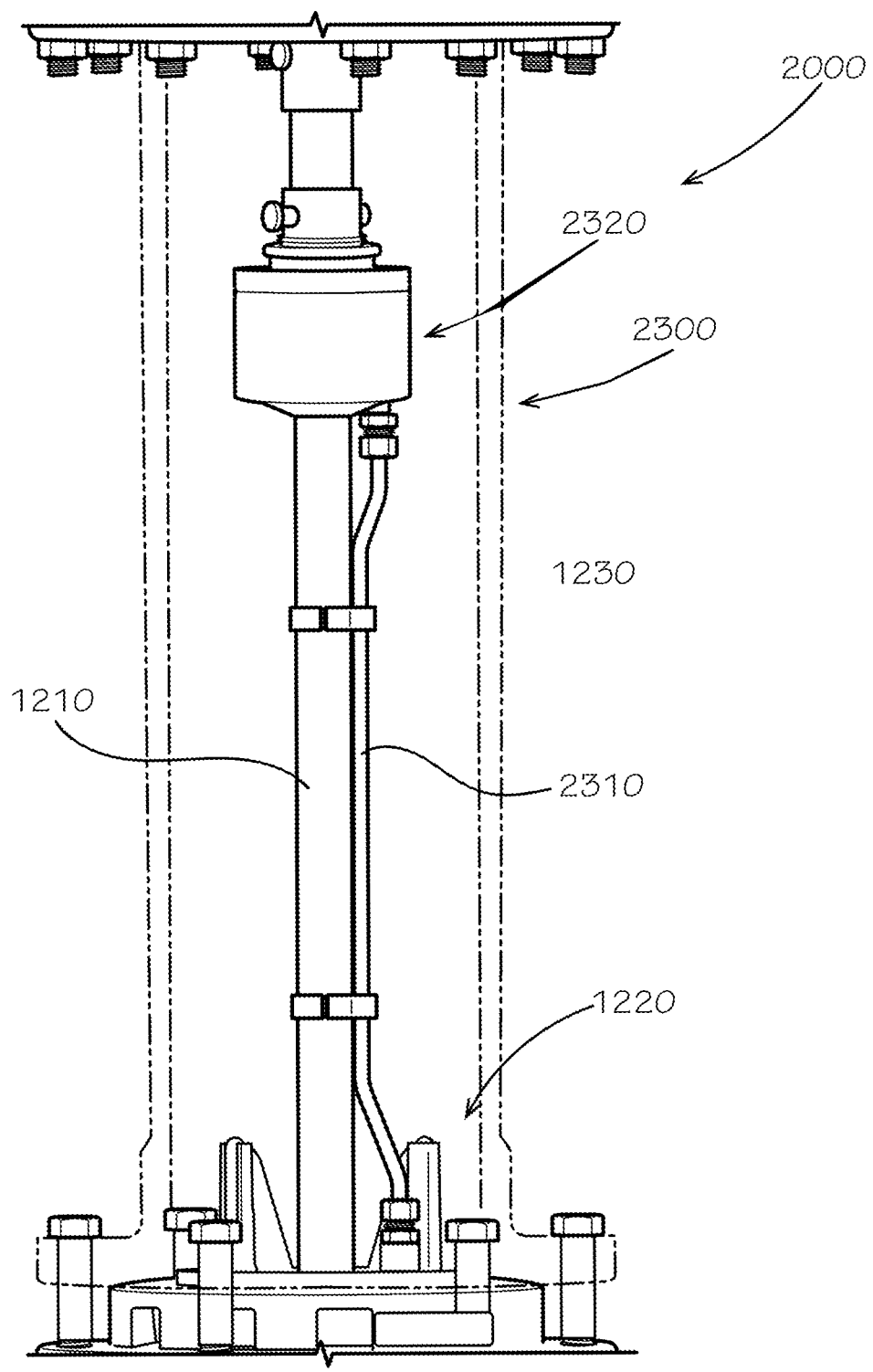
FIG. 13 is a close-up side view of a fire hydrant assembly in accord with one aspect of the current disclosure, wherein a portion of the assembly is displayed as transparent.
Figure 14:
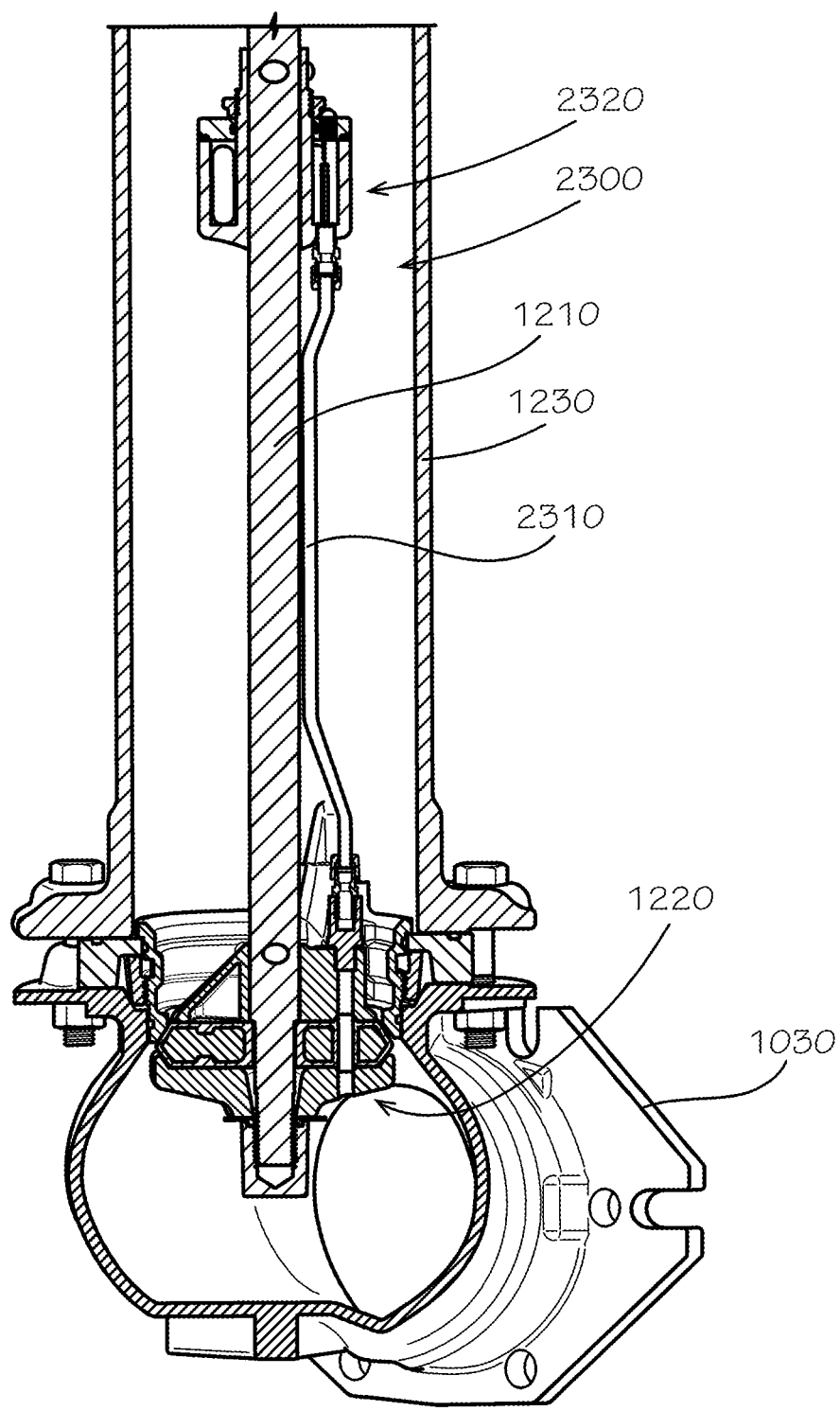
FIG. 14 is a cross-sectional view of the fire hydrant assembly of FIG. 13.

Another aspect of a fire hydrant 2000 can be seen with respect to FIG. 13-14. The fire hydrant 2000 can comprise the valve assembly 1220 and the lower barrel 1230, as well as many other portions of the fire hydrant 1000. In the current aspect, the fire hydrant 2000 can comprise a sensing assembly 2300. A vein 2310 can be substantially more elongated than the vein 1310. A main body 2320 can be integrated with electronics and sensing into a small compartment located near the stem 1210.

Figure 15:
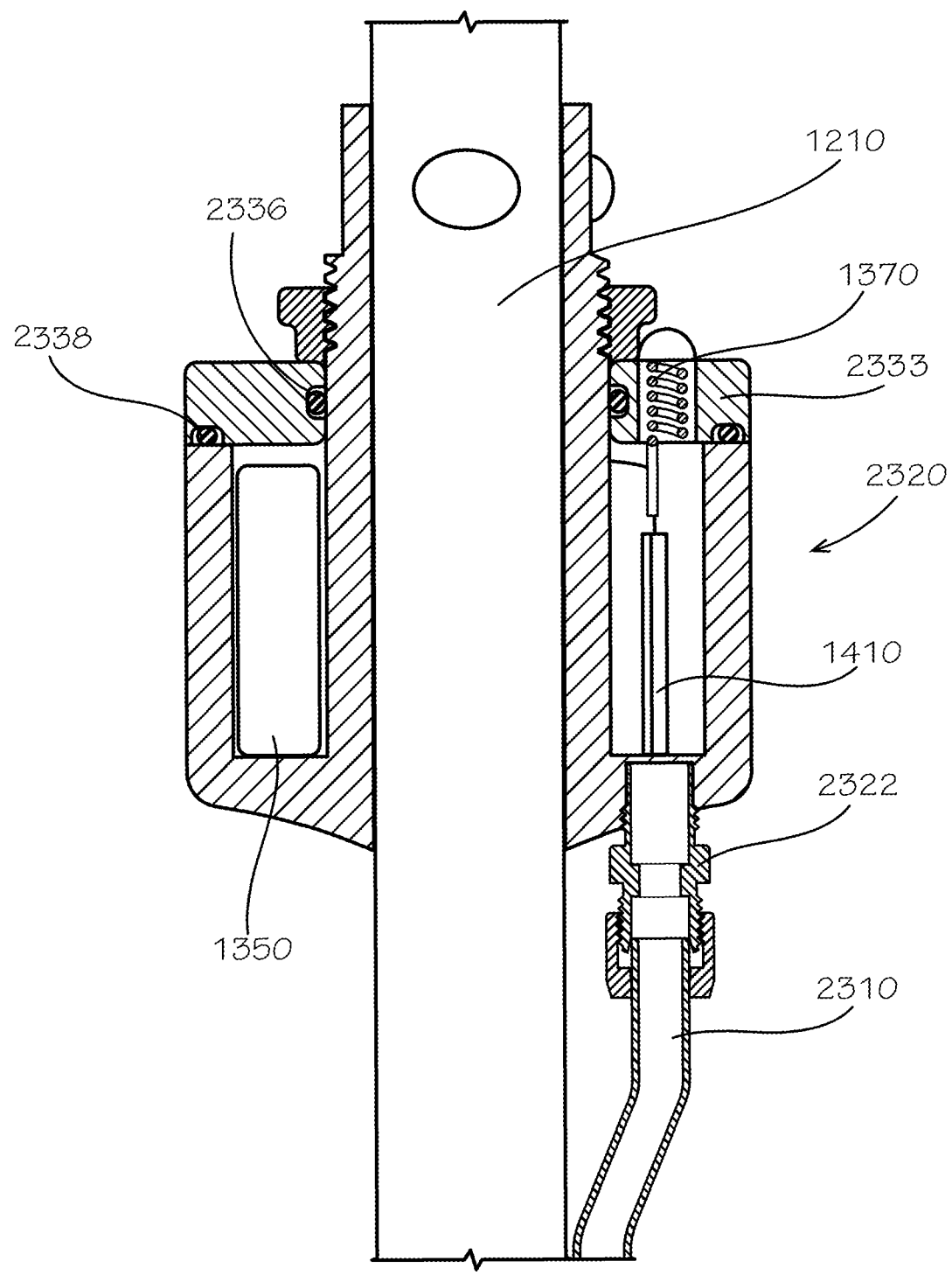
FIG. 15 is a close-up cross-sectional view of the fire hydrant assembly of FIG. 13.

As seen with the view of FIG. 15, the vein 2310 can connect to the main body 2320 by a fitting 2322. The main body 2320 can be sealed by a cap 2333 and by gaskets 2336,2338. The PCB 1410 can be located within the main body 2320 along with any sensor (not shown) and the batteries 1350. The antenna 1370 can be housed within the main body 2320 and can protrude through the cap 2333. The main body 2320 can be mounted to the stem 1210.

Figure 16:
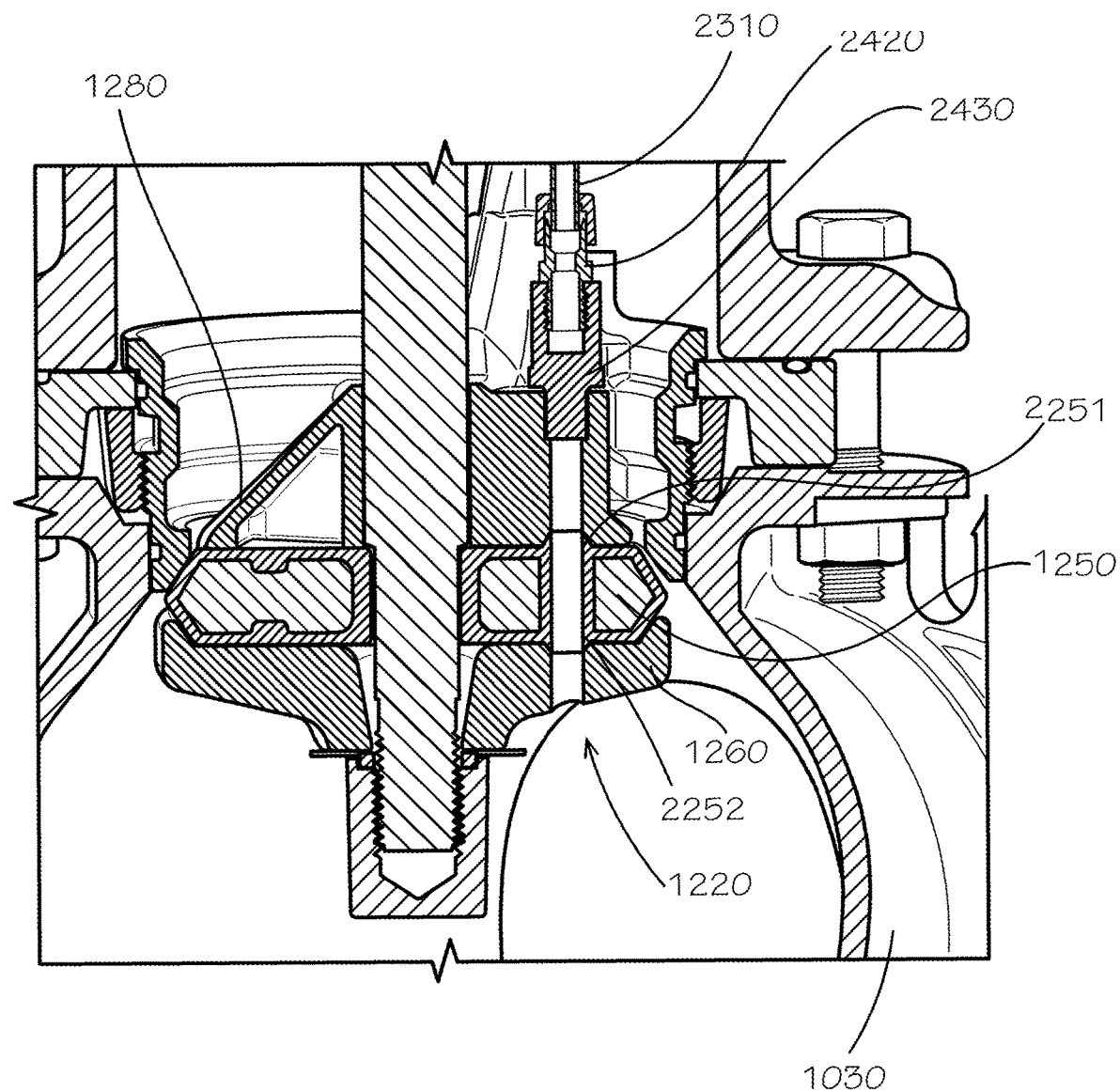
FIG. 16 is a close-up cross-sectional view of the fire hydrant assembly of FIG. 13.

As seen with reference to FIG. 16, the vein 2310 can be attached to the valve reinforcement 1280 using a plurality of fittings 2420, 2430. Also seen, the valve plate 1250 can comprise additional sealing elements 2251, 2252 around the vein bore 1252 to prevent fluid from leaking between the valve reinforcement 1280, the valve plate 1250, and the valve retainer 1260.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fire hydrant comprising:
   an upper barrel defining a cavity for fluid flow;
   a bonnet connected to a top of the upper barrel;
   a lower barrel assembly connected to a bottom of the upper barrel, the lower barrel assembly comprising a lower barrel defining a cavity in fluid communication with the cavity of the upper barrel, the lower barrel assembly comprising a sensing assembly located within the cavity of the lower barrel, the sensing assembly comprising:
      a vein, the vein defining a channel providing fluid communication from a lower end of the vein to an upper end of the vein;
      an electronics assembly connected to an upper end of the vein, the electronics assembly comprising:
         a sensor in fluid communication with the channel;
         at least one battery in electrical communication with the sensor; and an antenna in electrical communication with the sensor; and a cover surrounding the electronics assembly, the cover defining a void, wherein at least a portion of the antenna protrudes through the void;

a shoe connected to a bottom of the lower barrel assembly, the shoe defining a cavity;

a valve assembly located in sealing communication with a lower end of the lower barrel, the valve assembly comprising:

a valve plate for sealing the valve proximate a lower end of the lower barrel, the valve plate defining a vein bore;

a valve retainer contacting the valve plate and located within the cavity of the shoe, the valve retainer defining a vein bore; and a valve reinforcement contacting the valve plate and located within the cavity of the lower barrel, the valve reinforcement defining a vein bore, wherein the channel of the vein is in fluid communication with the cavity of the shoe through the vein bore of the valve plate, the vein bore of the valve retainer, and the vein bore of the valve reinforcement; and a stem mechanically connected to the valve assembly to allow opening and closing of the sealing communication of the valve assembly with the lower end of the lower barrel.

2. The fire hydrant of claim 1, wherein the sensing assembly is connected to the stem.

3. The fire hydrant of claim 1, further comprising a nozzle connected within the channel of the vein, the nozzle in sealing contact with the sensor, the sensor in fluid communication with the channel.

4. The fire hydrant of claim 1, wherein the sensor is a pressure sensor.

5. The fire hydrant of claim 1, wherein the sensor assembly further comprises a battery pack assembly, the battery pack assembly comprising at least one battery and a battery container.

6. The fire hydrant of claim 1, wherein at least a portion of the vein is located within the vein bore of the valve plate, the vein bore of the valve retainer, and the vein bore of the valve reinforcement.

7. The fire hydrant of claim 1, wherein the antenna is a near-field communication antenna.

8. The fire hydrant of claim 1, wherein the electronics assembly further comprises a PCB in electrical communication with the sensor.

9. The fire hydrant of claim 1, further comprising a cap sealing at least one end of the cover, the cap defining a void, the antenna arranged within the void.

10. A sensing assembly comprising:

a vein, the vein defining a channel providing fluid communication from a lower end of the vein to an upper end of the vein;

an electronics assembly connected to an upper end of the vein, the electronics assembly comprising:

a sensor in fluid communication with the channel;

at least one battery in electrical communication with the sensor; and an antenna in electrical communication with the sensor; and a cover surrounding the electronics assembly, the cover defining a void, wherein at least a portion of the antenna protrudes through the void.

11. The sensing assembly of claim 10, further comprising at least one gasket arranged between the vein and the cover.

12. The sensing assembly of claim 10, further comprising a nozzle connected within the channel of the vein, the nozzle in sealing contact with the sensor, the sensor in fluid communication with the channel.

13. The sensing assembly of claim 10, wherein the sensor is a pressure sensor.

14. The sensing assembly of claim 10, further comprising a battery pack assembly, the battery pack assembly comprising at least one battery and a battery container.

15. The sensing assembly of claim 10, wherein the antenna is a near field communication antenna.

16. The sensing assembly of claim 10, further comprising a PCB in electrical communication with the sensor.

17. The sensing assembly of claim 10, further comprising a cap sealing at least one end of the cover, the cap defining a void, the antenna arranged within the void.

18. A method of forming a sensing assembly, the method comprising:

obtaining a vein, the vein defining a channel providing fluid communication from a lower end of the vein to an upper end of the vein;

connecting an electronics assembly connected to an upper end of the vein, wherein the step of connecting an electronics assembly to an upper end of the vein comprises:

placing a sensor in fluid communication with the channel;

connecting at least one battery in electrical communication with the sensor; and connecting an antenna in electrical communication with the sensor;

placing a cover surrounding the electronics assembly, the cover defining a void; and arranging the antenna wherein at least a portion of the antenna protrudes through the void.

19. The method of claim 18, wherein the sensor is a pressure sensor.

20. The method of claim 18, further comprising the step of connecting a PCB in electrical communication with the sensor.

* * * * *